United States Patent
Bhavsar et al.

(10) Patent No.: US 9,945,601 B1
(45) Date of Patent: Apr. 17, 2018

(54) REFRIGERATOR SHELF AND METHOD FOR PRODUCING THE SHELF

(71) Applicant: Whirlpool Corporation, Benton Harbor, MI (US)

(72) Inventors: Atish J. Bhavsar, Amana, IA (US); Shrinivas V. Pawar, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/294,093

(22) Filed: Oct. 14, 2016

(51) Int. Cl.
| | |
|---|---|
| F25D 25/02 | (2006.01) |
| B29C 45/14 | (2006.01) |
| B29C 45/00 | (2006.01) |
| B29C 65/48 | (2006.01) |
| B29C 65/56 | (2006.01) |
| B29C 65/00 | (2006.01) |
| B29K 105/20 | (2006.01) |
| B29K 709/08 | (2006.01) |
| B29L 9/00 | (2006.01) |
| B29L 31/00 | (2006.01) |

(52) U.S. Cl.
CPC .......... *F25D 25/02* (2013.01); *B29C 45/0053* (2013.01); *B29C 45/14434* (2013.01); *B29C 65/48* (2013.01); *B29C 65/562* (2013.01); *B29C 66/12461* (2013.01); *B29C 66/304* (2013.01); *B29C 66/742* (2013.01); *B29K 2105/20* (2013.01); *B29K 2709/08* (2013.01); *B29K 2995/0078* (2013.01); *B29L 2009/003* (2013.01); *B29L 2031/74* (2013.01); *F25D 2325/022* (2013.01)

(58) Field of Classification Search
CPC ....... A47B 96/02; A47B 96/022; F25D 25/02; F25D 23/08; F25D 2325/022
See application file for complete search history.

(56) References Cited

U.S. PATENT DOCUMENTS

| | | | | |
|---|---|---|---|---|
| 4,934,541 A | * | 6/1990 | Bussan | F25D 25/02 108/27 |
| 4,960,308 A | | 10/1990 | Donaghy | |
| 5,044,704 A | | 9/1991 | Bussan et al. | |
| 5,273,354 A | * | 12/1993 | Herrmann | A47B 96/025 312/408 |
| 5,403,084 A | | 4/1995 | Kane et al. | |
| 5,429,433 A | | 7/1995 | Bird et al. | |
| 5,441,338 A | | 8/1995 | Kane et al. | |
| 5,516,204 A | * | 5/1996 | Calvert | A47B 46/00 312/330.1 |
| 5,524,981 A | | 6/1996 | Herrmann et al. | |
| 5,564,809 A | * | 10/1996 | Kane | A47B 57/16 211/193 |
| 5,660,777 A | | 8/1997 | Herrmann et al. | |
| 5,947,574 A | * | 9/1999 | Avendano | A47B 96/062 312/351 |
| 6,120,720 A | | 9/2000 | Meier et al. | |

(Continued)

*Primary Examiner* — Daniel J Rohrhoff
(74) *Attorney, Agent, or Firm* — Diederiks & Whitelaw, PLC

(57) ABSTRACT

A refrigerator includes a refrigerated compartment and a door that selectively seals the refrigerated compartment. A shelf is mounted in the refrigerated compartment. The shelf includes a plate and a frame encapsulating the plate. A front trim is coupled to a front portion of the frame. The front trim includes a front face that is flush with the frame.

20 Claims, 8 Drawing Sheets

(56) References Cited

U.S. PATENT DOCUMENTS

| | | | |
|---|---|---|---|
| 6,174,482 B1 | 1/2001 | Reames et al. | |
| 6,210,618 B1 | 4/2001 | Bird et al. | |
| 6,422,673 B1* | 7/2002 | Bienick | F25D 25/024 |
| | | | 312/351 |
| 6,488,347 B1 | 12/2002 | Bienick | |
| 6,558,601 B1 | 5/2003 | Reames et al. | |
| 6,604,800 B2* | 8/2003 | Hamilton | F25D 25/024 |
| | | | 312/334.5 |
| 6,761,949 B2 | 7/2004 | Reames et al. | |
| 7,300,122 B2 | 11/2007 | Vardon | |
| 9,261,305 B2 | 2/2016 | Tunzi | |
| 2003/0006683 A1* | 1/2003 | Bienick | F25D 25/024 |
| | | | 312/408 |
| 2006/0254481 A1* | 11/2006 | Lee | F25D 25/02 |
| | | | 108/108 |
| 2011/0062845 A1* | 3/2011 | Leconte | A47B 96/02 |
| | | | 312/408 |
| 2011/0089800 A1* | 4/2011 | Nash | A47B 96/028 |
| | | | 312/404 |
| 2011/0148268 A1* | 6/2011 | Driver | F25D 25/02 |
| | | | 312/408 |
| 2012/0104924 A1* | 5/2012 | Nash | F25D 25/02 |
| | | | 312/408 |
| 2012/0106129 A1* | 5/2012 | Glovatsky | F25D 27/00 |
| | | | 362/92 |
| 2015/0153099 A1* | 6/2015 | Nash | F25D 25/024 |
| | | | 312/408 |
| 2015/0342350 A1* | 12/2015 | Sankhgond | A47B 96/024 |
| | | | 108/42 |

* cited by examiner

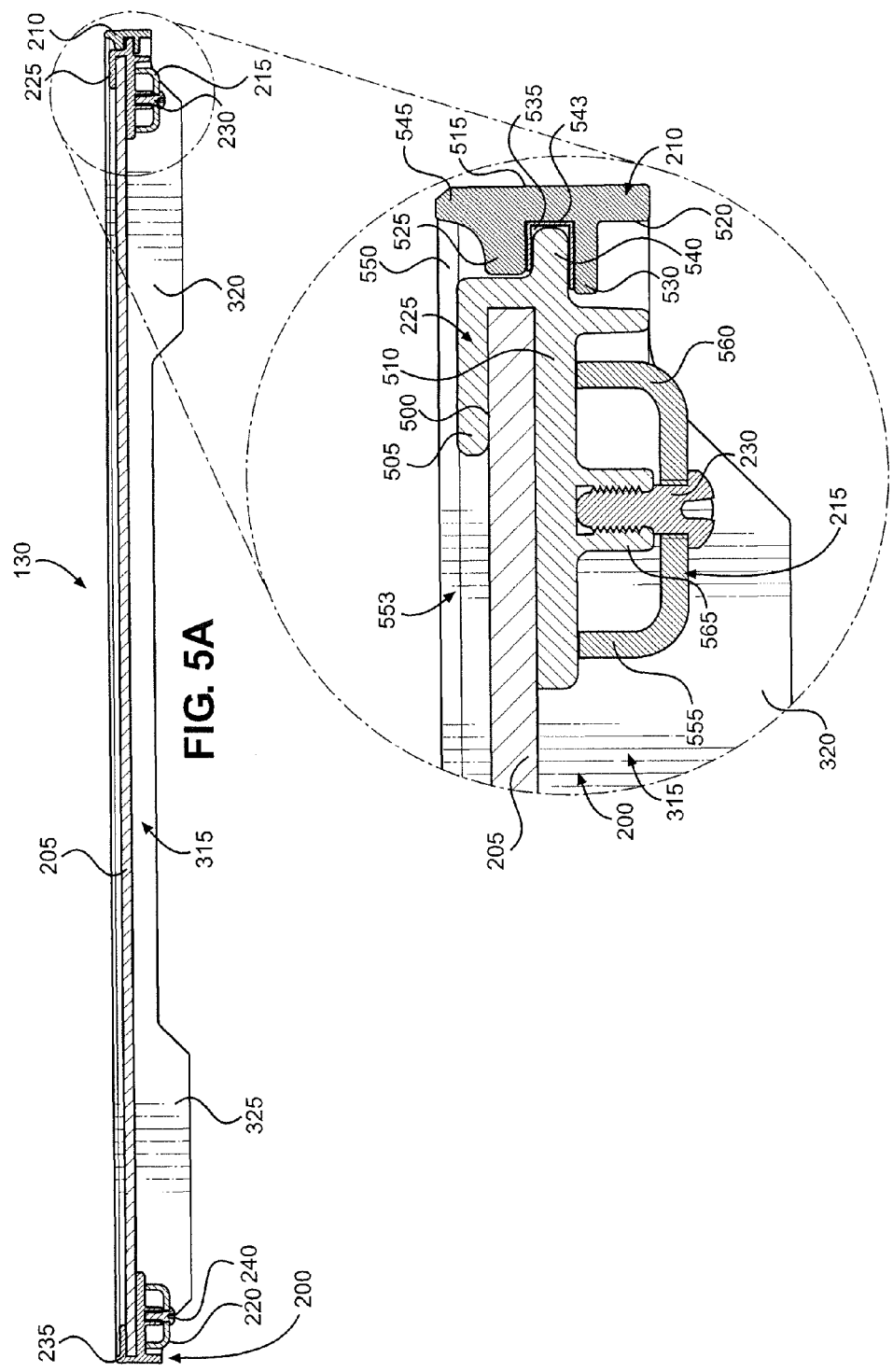

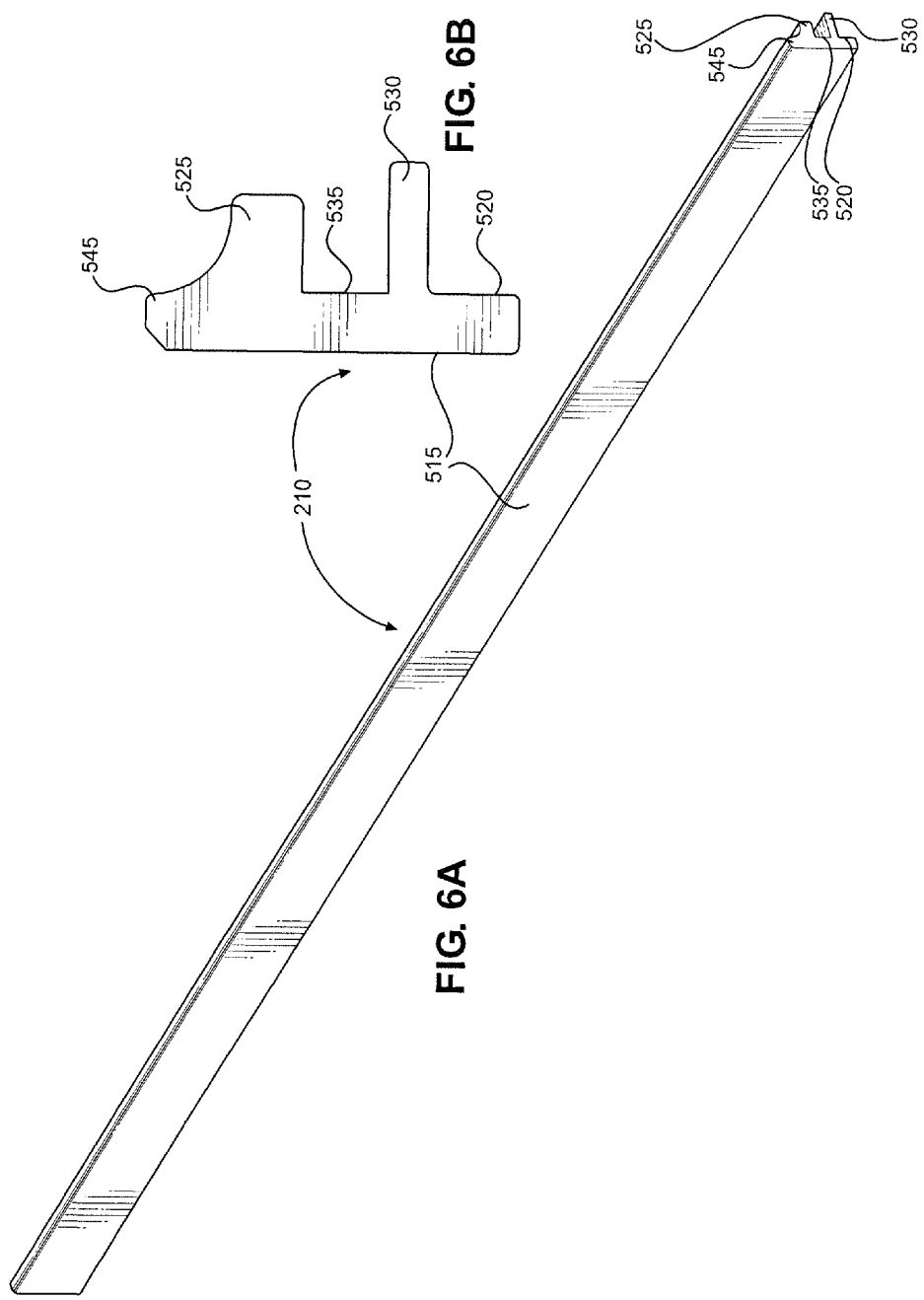

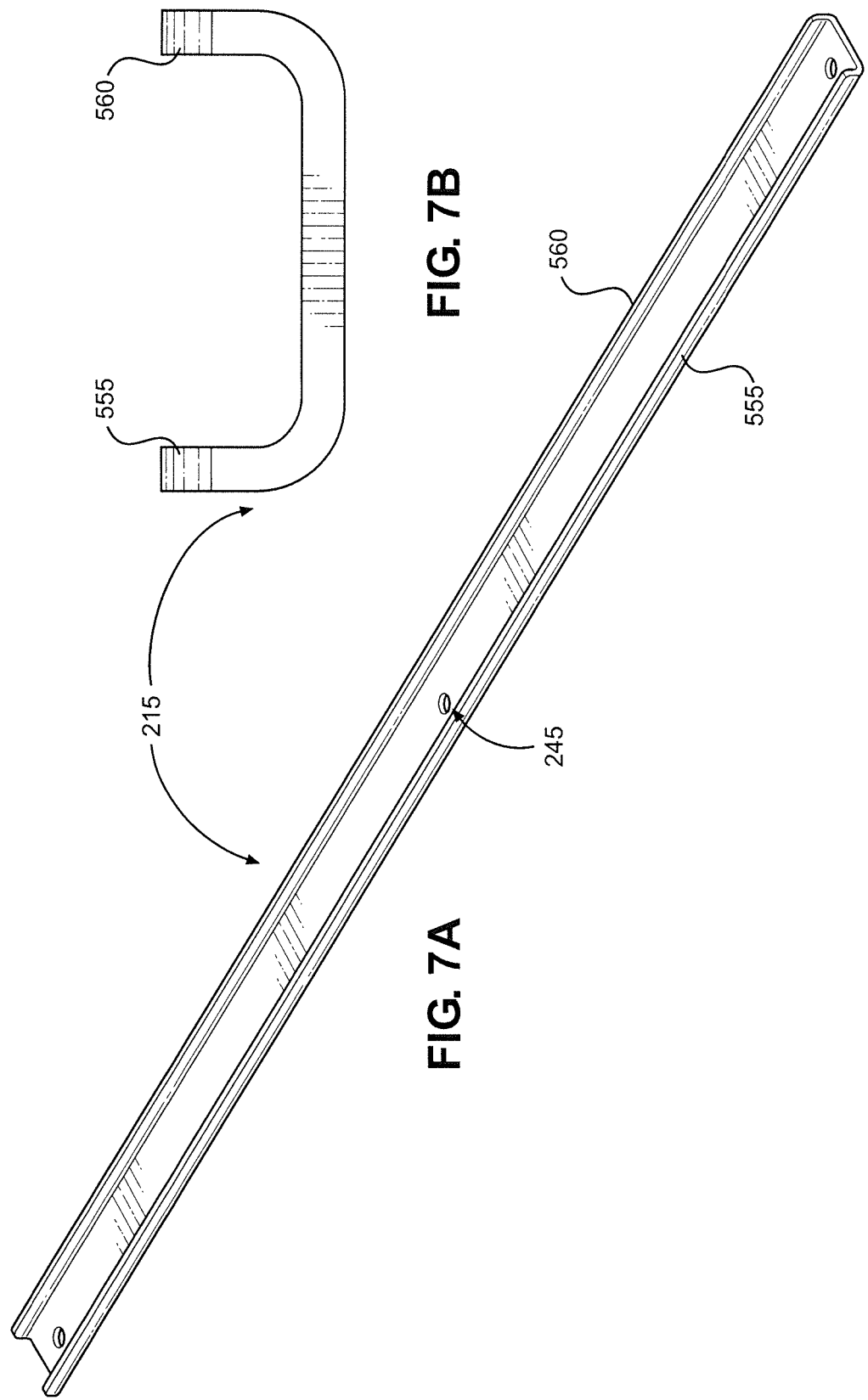

REFRIGERATOR SHELF AND METHOD FOR PRODUCING THE SHELF

BACKGROUND OF THE INVENTION

The present invention pertains to the art of refrigeration and, more particularly, to refrigerator shelves.

Production of current refrigerator shelf designs is often time consuming and expensive. For example, the glass of a shelf needs to be secured to the frame by an adhesive or mechanical fastening mechanism. Such adhesives are expensive and require curing time. Similarly, mechanical fastening mechanisms add cost and complexity. These arrangements can also make a shelf less robust.

In view of the above, there is a need in the art for a refrigerator shelf that can be quickly and inexpensively produced, while actually being robust.

SUMMARY OF THE INVENTION

The present invention is directed to a refrigerator comprising a refrigerated compartment and a door configured to selectively seal the refrigerated compartment. A shelf is mounted in the refrigerated compartment. The shelf includes a plate and a frame encapsulating the plate. A front trim is coupled to a front portion of the frame. The front trim includes a front face that is flush with the frame.

In one embodiment, the front trim includes a first upper lip, and the frame includes a second upper lip. The first and second upper lips together define a rim of the shelf. Preferably, a shape of the first upper lip matches a shape of the second upper lip.

In one embodiment, one of the frame and front trim defines a first U-shaped channel, and the other of the frame and front trim includes a protrusion received in the first U-shaped channel. The shelf further includes an adhesive in the first U-shaped channel.

In one embodiment, the shelf further includes a U-shaped reinforcement bar coupled to the front portion or a rear portion of the frame. The reinforcement bar includes two legs, each leg having an end in contact with the frame, and a hole in which a mechanical fastener is received. The frame includes a peg extending downward from the frame, with a bore being formed in the peg. The mechanical fastener is received in the bore.

In one embodiment, the frame is a single integral piece, and the frame extends both above and below an edge of the plate. The frame defines a second U-shaped channel, and the plate is received in the second U-shaped channel. Preferably, the plate is a glass plate, and the frame is injection-molded plastic.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 5A is a cross section of the shelf of FIG. 2;

FIG. 5B is an enlarged view of a portion of FIG. 5A;

FIG. 6A is a perspective view of a front trim of the shelf;

FIG. 6B is a side view of the front trim;

FIG. 7A is a perspective view of a reinforcement bar of the shelf; and

FIG. 7B is a side view of the reinforcement bar.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention.

Figure 1:
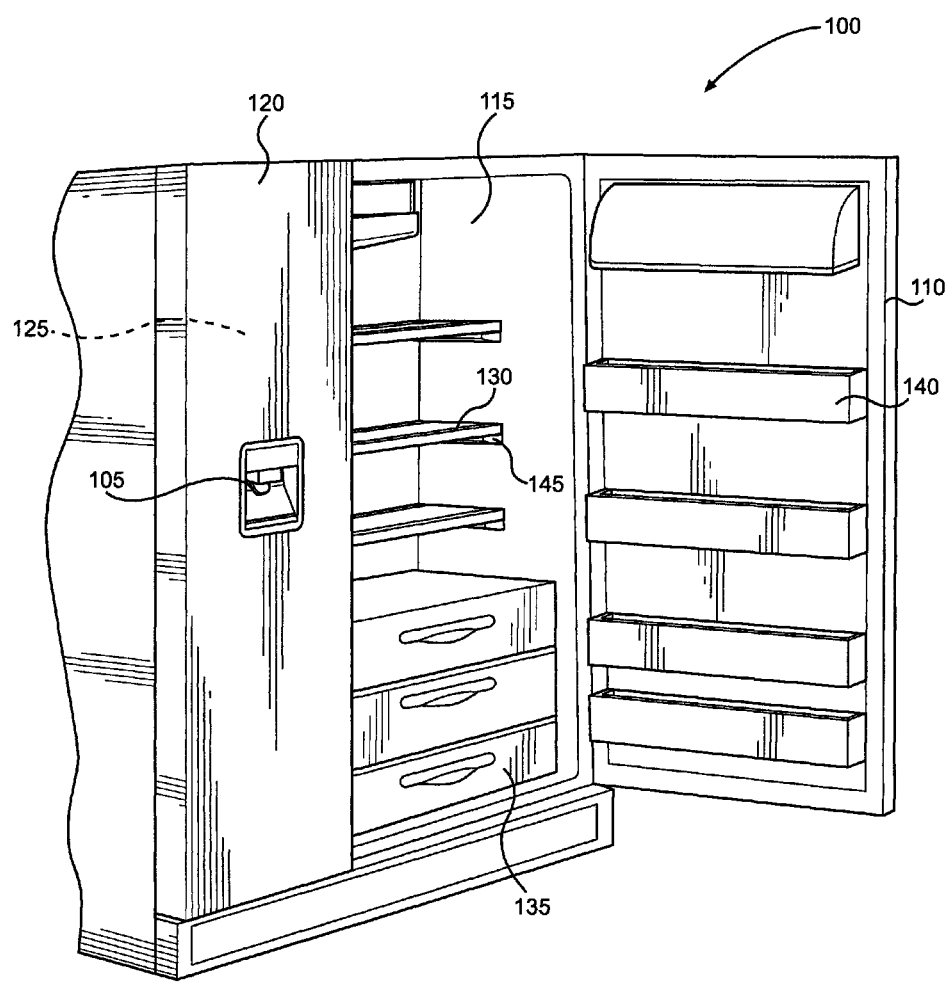
FIG. 1 is a perspective view of a refrigerator constructed in accordance with the present invention.

With initial reference to FIG. 1, there is illustrated a refrigerator 100 constructed in accordance with the present invention. Refrigerator 100 is shown in a side-by-side configuration, although the present invention can be used with other refrigerator configurations, including French door, bottom mount and top mount refrigerators. Refrigerator 100 includes a dispenser 105, which selectively dispenses ice or water when desired by a user; a fresh food door 110, which selectively seals a fresh food compartment 115; and a freezer door 120, which selectively seals a freezer compartment 125. Refrigerator 100 also includes a plurality of shelves (one of which is labeled 130), a plurality of drawers (one of which is labeled 135) and a plurality of door bins (one of which is labeled 140). The shelves are supported on a corresponding plurality of rails (one of which is labeled 145), which are preferably formed integrally with the side walls of fresh food compartment 115 during a thermoforming process. As illustrated, each shelf extends across an entire width of fresh food compartment 115 (aside from certain small gaps between adjacent structure). However, some or all of the shelves can also be placed side-by-side such that each shelf extends across a half, a third or a quarter of the width of fresh food compartment 115, for example. Although not visible, refrigerator 100 includes a refrigeration system that establishes above and below freezing temperatures in compartments 115 and 125. In other words, the refrigeration system cools the refrigerated compartments of refrigerator 100.

Figure 2:
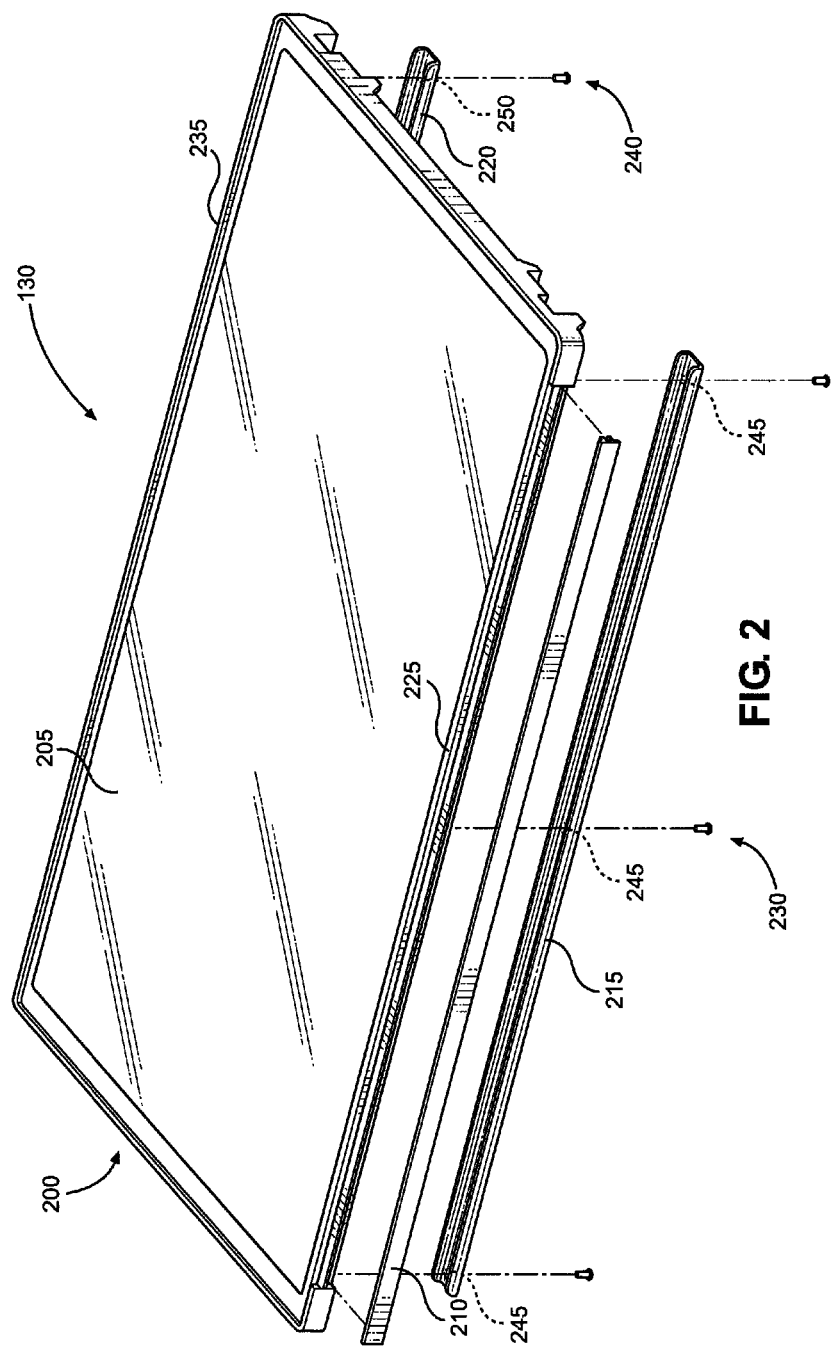
FIG. 2 is an exploded view of a shelf constructed in accordance with the present invention.

With reference now to FIG. 2, an exploded view of shelf 130 is provided. Shelf 130 includes a plastic frame 200 and a glass plate 205, with plate 205 being encapsulated by frame 200. Specifically, plate 205 is encapsulated by frame 200 during injection molding of frame 200. For purposes of the present invention, by plate 205 being encapsulated by frame 200, it is meant that frame 200 sufficiently surrounds plate 205 that plate 205 will not separate from frame 200 unless at least one of frame 200 and plate 205 is broken or deformed. As a result of this arrangement, frame 200 and plate 205 essentially form one integral structure, which increases the strength of shelf 130. In addition, this shelf design does not require an adhesive or separate mechanical fastening mechanism to prevent plate 205 from separating from frame 200, thereby decreasing the cost, complexity and production time of shelf 130.

In order to best accomplish these goals, frame 200 is formed as a single integral piece during injection molding of frame 200 with plate 205. However, this does not mean that additional structure cannot later be attached to frame 200. Rather, such additional structure is not considered to be part of the actual frame 200 for purposes of the present invention. Along these lines, shelf 130 further includes a front trim 210, a front reinforcement bar 215 and a rear reinforcement bar 220. In the embodiment illustrated, trim 210 is directly coupled to a front portion 225 of frame 200, such as by attaching trim 210 to frame 200 through the use of an adhesive (not shown) or a metal trim 210 can be attached to a plastic frame 200 during injection modeling with a glass plate 205). In addition, front reinforcement bar 215 is directly coupled to front portion 225 of frame 200 by a plurality of mechanical fasteners (collectively labeled 230) and rear reinforcement bar 220 is directly coupled to a rear portion 235 of frame 200 by another plurality of mechanical fasteners (collectively labeled 240). Fasteners 230 are inserted into a plurality of holes (collectively labeled 245) formed in front reinforcement bar 215, while fasteners 240 are inserted into another plurality of holes (collectively labeled 250) formed in rear reinforcement bar 220. Preferably, fasteners 230 and 240 are self-tapping screws. However, it should be recognized that other fastening arrangements known in the art can be used. Trim 210 is preferably made from a plastic or metal and serves to improve the look and feel of shelf 130. Reinforcement bars 215 and 220 are preferably made from metal and serve to further increase the strength of shelf 130.

Figure 3A:
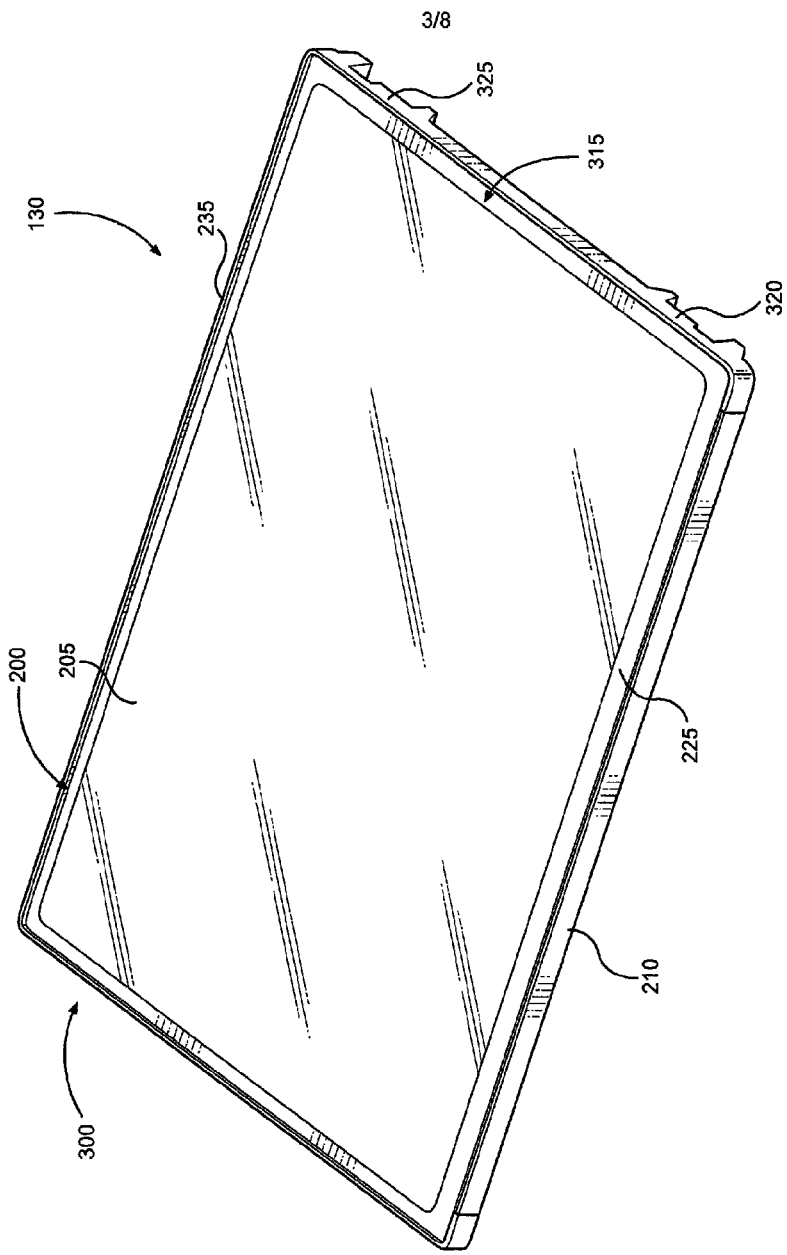
FIG. 3A is a perspective view of a top of the shelf of FIG. 2.
Figure 3B:
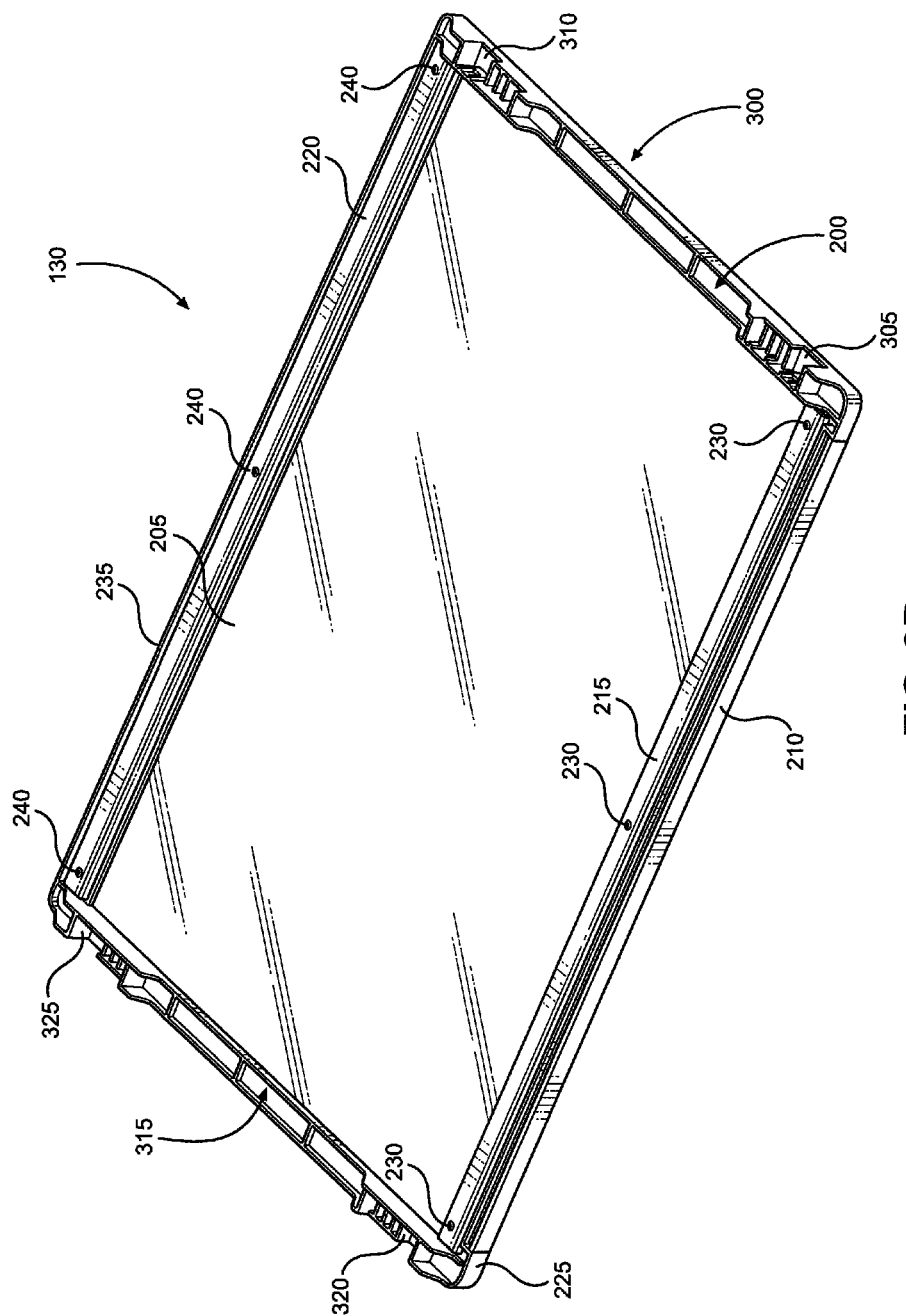
FIG. 3B is a perspective view of a bottom of the shelf of FIG. 2.

FIGS. 3A and 3B show the top and bottom, respectively, of shelf 130 after trim 210 and reinforcement bars 215 and 220 have been coupled to frame 200. In particular, in FIG. 3A, trim 210 can be seen coupled to front portion 225 of frame 200 such that trim 210 is flush with frame 200. Similarly, in FIG. 3B, front reinforcement bar 215 can be seen coupled to front portion 225 of frame 200 by fasteners 230, and rear reinforcement bar 220 can be seen coupled to rear portion 235 of frame 200 by fasteners 240. FIG. 3B also shows the mating structure formed as part of frame 200. This mating structure extends downward from shelf 130 and is configured to engage with corresponding structure (not shown) of the rails of fresh food compartment 115 (e.g., rail 145). Specifically, a left portion 300 of frame 200 includes front mating structure 305 and rear mating structure 310, while a right portion 315 of frame 200 includes front mating structure 320 and rear mating structure 325. This arrangement limits or prevents shelf 130 from shifting forward and rearward once mating structure 305, 310, 320, 325 engages with the corresponding rail structure, i.e., once shelf 130 is mounted in fresh food compartment 115. In a particular embodiment, to remove shelf 130, shelf 130 must be lifted upward, out of contact with the rails, and then pulled forward.

Figure 4:
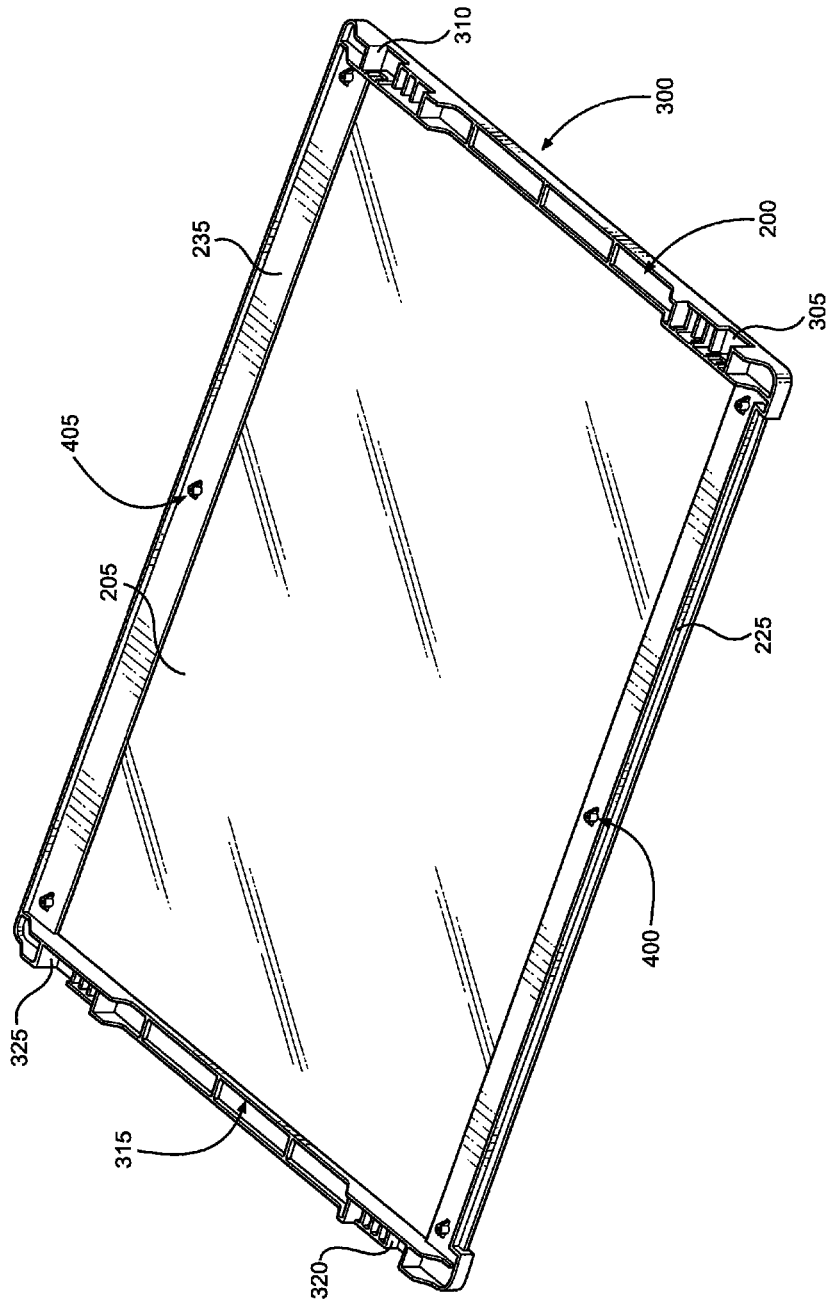
FIG. 4 is a perspective view of the bottom of the shelf of FIG. 2, showing only the frame and glass of the shelf.

As with FIG. 3B, FIG. 4 shows the bottom of shelf 130 except that trim 210 and reinforcement bars 215 and 220 have been removed. As a result, the mounting holes formed in frame 200 are visible. In particular, front portion 225 of frame includes a plurality of bores (collectively labeled 400), and rear portion 235 of frame 200 includes another plurality of bores (collectively labeled 405). Bores 400 receive fasteners 230 to secure front reinforcement bar 215 to frame 200, while bores 405 receive fasteners 240 to secure rear reinforcement bar 220 to frame 200.

With reference now to FIGS. 5A and 5B, shelf 130 is shown in partial cross section. These views highlight certain of the above-described features of shelf 130 including the encapsulation of plate 205 in frame 200. In particular, it can be seen that frame 200 is formed as one integral piece and that frame 200 extends both above and below plate 205. As evidenced by FIGS. 2-5, frame 200 extends above and below plate 205 along the entire edge of plate 205 such that plate 205 will not separate from frame 200 unless at least one of frame 200 and plate 205 is broken or deformed. However, it should be recognized that frame 200 need not extend above and below plate 205 along the entire edge of plate 205. In other words, frame 200 can encapsulate plate 205 while extending above and below plate 205 along only a portion of the edge or each peripheral side of plate 205. Regardless, with particular reference to FIG. 5B, it can be seen that plate 205 is received in a U-shaped channel 500 defined in frame 200. Specifically, channel 500 is defined between an upper portion 505 and a lower portion 510 of frame 200.

The views of FIGS. 5A and 5B also highlight the attachment of trim 210 and reinforcement bars 215 and 220 to frame 200. Trim 210 includes a front face 515, a rear face 520, an upper protrusion 525 and a lower protrusion 530, with protrusions 525 and 530 extending rearward from rear face 520. Front face 515 is flush with frame 200, as can be best seen in FIGS. 3A and 3B. With reference again to FIGS. 5A and 5B, protrusions 525 and 530 define a U-shaped channel 535 in which a corresponding protrusion 540 of frame 200 is received. Alternatively, this arrangement can be reversed, i.e., with a protrusion of trim 210 received in a U-shaped channel of frame 200. As discussed above, trim 210 can be coupled to frame 200 by an adhesive 543 (shown in FIG. 5B). Preferably, as shown, adhesive 543 is located in channel 535 and contacts one or more of protrusions 525, 530 and 540. Trim 210 also includes an upper lip 545 extending along its length. The shape of upper lip 545 matches the shape of an upper lip 550 of frame 200, which extends along front, rear, left and right portions 225, 235, 300, 315 of frame 200, as can be seen in FIGS. 2, 3A, 5A and 5B. Together lips 545 and 550 define a rim 553 around shelf 130. With respect to reinforcement bars 215 and 220, as can be seen in FIGS. 5A and 5B, reinforcement bars 215 and 220 are U-shaped, with the legs of the "U" in contact with frame 200 and fasteners extending through the base of the "U". Specifically, with reference to FIG. 5B, front reinforcement bar 215 includes legs 555 and 560, the ends of which are in contact with front portion 225 of frame 200. Fasteners 230 extend through holes 245 in front reinforcement bar 215 and into bores 400 in frame 200 to couple front reinforcement bar 215 to frame 200. Bores 400 are located in corresponding pegs or posts (one of which is labeled 565) that extend downward from the rest of frame 200. Rear reinforcement bar 220 is constructed and coupled to frame 200 in an identical manner, although this need not be the case.

In addition to the above, FIGS. 5A and 5B highlight the side profile of mating structure 320, 325. As previously discussed, mating structure 320, 325 extends downward from shelf 130 and is configured to engage with corresponding structure (not shown) of the rails of fresh food compartment 115 (e.g., rail 145). Based on the side profile (i.e., the shape) of mating structure 320, 325, it should be readily apparent that this corresponding rail structure can extend upward from or constitute holes in the rails, for example. Mating structure 305, 310 is constructed in an identical manner to mating structure 320, 325, although this need not be the case.

With reference now to FIGS. 6A and 6B, trim 210 is shown separately from the rest of shelf 130. As discussed above, trim 210 includes front face 515, rear face 520, upper protrusion 525, lower protrusion 530 and upper lip 545, with protrusions 525 and 530 extending rearward from rear face 520 to define channel 535. In FIGS. 7A and 7B, front reinforcement bar 215 is shown separately from the rest of shelf 130. As discussed above, front reinforcement bar 215 is U-shaped and includes holes 245 and legs 555 and 560. As previously noted, rear reinforcement bar 220 is identical to front reinforcement bar 215, although this need not be the case.

Based on the above, it should be readily apparent that the present invention provides a refrigerator shelf that can be quickly and inexpensively produced. In addition, the shelf is quite robust compared to current shelf designs. Although described with reference to preferred embodiments, it should be readily understood that various changes or modifications could be made to the invention without departing from the spirit thereof. For example, although frame 200 is described as being made from plastic and plate 205 is described as being made from glass, other appropriate materials known in the art can be used. Also, while shelf 130 is described as being located in fresh food compartment 115, shelf 130 can also be used in freezer compartment 125. In addition, in other embodiments, shelf 130 can include arms configured to support shelf 130 on vertical mounting rails located in fresh food compartment 115 or freezer compartment 125. In general, the invention is only intended to be limited by the scope of the following claims.

The invention claimed is:

1. A refrigerator comprising:
a refrigerated compartment;
a door configured to selectively seal the refrigerated compartment;
a shelf mounted in the refrigerated compartment, wherein the shelf includes:
a plate;
a frame encapsulating the plate; and
a front trim is separate from and coupled to a front portion of the frame,
wherein the front trim includes a front face that is flush with the frame.

2. The refrigerator of claim 1, wherein:
the front trim includes a first upper lip;
the frame includes a second upper lip;
the first and second upper lips together define a rim of the shelf; and
a shape of the first upper lip matches a shape of the second upper lip.

3. The refrigerator of claim 1, wherein:
one of the frame and front trim defines a first U-shaped channel and the other of the frame and front trim includes a protrusion received in the first U-shaped channel; and
the shelf further includes an adhesive in the first U-shaped channel.

4. The refrigerator of claim 1, wherein the shelf further includes a U-shaped reinforcement bar coupled to the front portion or a rear portion of the frame, the reinforcement bar including:
two legs, each leg having an end in contact with the frame; and
a hole in which a mechanical fastener is received.

5. The refrigerator of claim 4, wherein:
the frame includes a peg extending downward from the frame;
a bore is located in the peg; and
the mechanical fastener is received in the bore.

6. The refrigerator of claim 1, wherein:
the frame is a single integral piece;
the frame extends both above and below an edge of the plate;
the plate is a glass plate; and
the frame is injection-molded plastic.

7. The refrigerator of claim 6, wherein:
the frame defines a second U-shaped channel; and
the plate is received in the second U-shaped channel.

8. A shelf comprising:
a plate;
a frame encapsulating the plate; and
a front trim coupled to a front portion of the frame, wherein the front trim includes a front face that is flush with the frame, and the front trim is separate from the frame.

9. The shelf of claim 8, wherein:
the front trim includes a first upper lip;
the frame includes a second upper lip; and
the first and second upper lips together define a rim of the shelf.

10. The shelf of claim 9, wherein a shape of the first upper lip matches a shape of the second upper lip.

11. The shelf of claim 8, wherein one of the frame and front trim defines a first U-shaped channel and the other of the frame and front trim includes a protrusion received in the first U-shaped channel.

12. The shelf of claim 8, further comprising a U-shaped reinforcement bar coupled to the front portion or a rear portion of the frame, the reinforcement bar including:
two legs, each leg having an end in contact with the frame; and
a hole in which a mechanical fastener is received.

13. The shelf of claim 12, wherein:
the frame includes a peg extending downward from the frame;
a bore is located in the peg; and
the mechanical fastener is received in the bore.

14. The shelf of claim 8, wherein:
the frame is a single integral piece; and
the frame extends both above and below an edge of the plate.

15. The shelf of claim 14, wherein:
the frame defines a second U-shaped channel; and
the plate is received in the second U-shaped channel.

16. The shelf of claim 14, wherein:
the plate is a glass plate; and
the frame is injection-molded plastic.

17. A method for producing a shelf, the method comprising:
encapsulating a plate in a frame during injection molding of the frame; and
coupling a front trim to a front portion of the frame by inserting a protrusion of one of the frame and front trim in a first U-shaped channel of the other of the frame and front trim, wherein the front trim includes a front face that is flush with the frame, and the front trim is separate from the frame.

18. The method of claim 17, wherein coupling the front trim to the front portion of the frame includes inserting an adhesive in the first U-shaped channel.

19. The method of claim 17, further comprising coupling a U-shaped reinforcement bar to the front portion or a rear portion of the frame.

20. The method of claim 19, wherein coupling the reinforcement bar to the frame includes inserting a mechanical fastener in a hole of the reinforcement bar and securing the mechanical fastener to the frame.

* * * * *